US008266085B1

(12) United States Patent
Meyers et al.

(10) Patent No.: US 8,266,085 B1
(45) Date of Patent: Sep. 11, 2012

(54) APPARATUS AND METHOD FOR USING ANALOG CIRCUITS TO EMBODY NON-LIPSCHITZ MATHEMATICS AND PROPERTIES USING ATTRACTOR AND REPULSION MODES

(75) Inventors: Ronald Everett Meyers, Columbia, MD (US); Keith Scott Deacon, Coumbia, MD (US); Gert Cauwenberghs, San Diego, CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/366,568

(22) Filed: Feb. 6, 2012

(51) Int. Cl.
*G06F 15/00* (2006.01)
(52) U.S. Cl. .......................................... 706/45
(58) Field of Classification Search .................. 706/12, 706/20, 45, 62
See application file for complete search history.

(56) References Cited

U.S. PATENT DOCUMENTS

| | | |
|---|---|---|
| 3,646,329 A | 2/1972 | Yoshino et al. |
| 4,660,166 A | 4/1987 | Hopfield |
| 4,866,645 A | 9/1989 | Lish |
| 4,873,455 A | 10/1989 | deChambost |
| 4,903,226 A | 2/1990 | Tsividis |
| 4,904,881 A | 2/1990 | Castro |
| 4,950,917 A | 8/1990 | Holler et al. |
| 4,961,005 A | 10/1990 | Salam |
| 5,021,693 A | 6/1991 | Shima |
| 5,045,713 A | 9/1991 | Shima |
| 5,059,814 A | 10/1991 | Mead et al. |
| 5,083,044 A | 1/1992 | Mead et al. |
| 5,093,803 A | 3/1992 | Howard et al. |
| 5,159,661 A | 10/1992 | Ovshinsky et al. |
| 5,172,204 A | 12/1992 | Hartstein |
| 5,195,170 A | 3/1993 | Eberhardt |
| 5,220,202 A | 6/1993 | Isono et al. |
| 5,329,610 A | 7/1994 | Castro |
| 5,341,051 A | 8/1994 | Kirk |
| 5,381,516 A | 1/1995 | Devos et al. |
| 5,509,105 A | 4/1996 | Roenker et al. |
| 5,517,139 A | 5/1996 | Chung et al. |
| 5,519,811 A | 5/1996 | Yoneda et al. |

(Continued)

OTHER PUBLICATIONS

Wang et al., Robust Adaptive Neural Network Control of Uncertain Nonholonomic Systems With Strong Nonlinear Drifts, 2004, IEEE, pp. 1-2.*

(Continued)

*Primary Examiner* — David Vincent
(74) *Attorney, Agent, or Firm* — Lawrence E. Anderson

(57) ABSTRACT

A network of coupled neurons for implementing Non-Lipschitz dynamics for modeling nonlinear processes or conditions comprising: a plurality of neurons, each being configurable in attractor and repulsion modes of operation, and programmable by an external signal; a plurality of synaptic connections for connecting at least a portion of the plurality of neurons for passage of data from one neuron to another; feedback circuitry for incrementing and decrementing an analog voltage output depending upon the output of the synaptic connection; whereby by the circuit solves Non-Lipschitz problems by programmably controlling the attractor and repulsion modes. A method of programming a network for solving Non-Lipschitz problems comprising providing a plurality of neurons, each programmable into a plurality of modes including repulsion and attraction modes; interconnecting the plurality of neurons using synaptic connections; providing feedback to at least one of the neurons; whereby by programming the neurons Non-Lipschitz terminal dynamics can be achieved.

19 Claims, 7 Drawing Sheets

U.S. PATENT DOCUMENTS

| | | | |
|---|---|---|---|
| 5,544,280 | A | 8/1996 | Liu et al. |
| 5,648,926 | A | 7/1997 | Douglas et al. |
| 5,717,833 | A | 2/1998 | Neely |
| 6,188,964 | B1 | 2/2001 | Reister et al. |
| 6,341,275 | B1 | 1/2002 | Shi et al. |

OTHER PUBLICATIONS

Wang et al., Neural Network-BAsed Adaptive Dynamic Surface COntrol for a class of Uncertain Nonlinear Systems in Strict-Feedback Form, 2005, IEEE, pp. 1-8*

Zak, Self-Supervised dynamical systems, 2004, Science direct, pp. 1-22.*

Zak, Michail, et al., "From Instability to Intelligence, Lecture Notes in Physics," 49, Springer-Verlag (1997).

Zbilut, J, et al. "A Terminal Dynamics Model of the Heartbeat," Biol. Cybern. 75, pp. 277-280.

Conte, E., et al., "A Brief Note on Possible Detection of Physiological Singulariites in Respiratory Dynamics by Recurrence Quantification Analysis of Lung Sounds," Chaos, Solitons, & Fractals, vol. 21, Issue 4 (40, pp. 869-877 (2004).

Guillani, A., "A Nonlinear Explanation of Aging-induced Changes in Heartbeat Dynamics," Am. J. Physiology-Heart and Circ. Physiol., 275(4), pp. H1455-H1461, 1998.

Zak, M., et al. "Non-Lipschitz Dynamics Approach to Discrete Event Systems," Mathematical Modelling and Scientific Computing: An International Journal (Dec. 1995).

Zak, M., "Introduction to terminal dynamics," Complex Systems 7, 59-87 (1993).

Zak, Michail, "Terminal Attractors for Addressable Memory in Neural Networks," Physics Letters A, vol. 133, Issues 1-2, pp. 18-22 (Oct. 31, 1988).

J. J. Hopfield, "Neural Networks and Physical Systems with Emergent Collective Computational Abilities," Proc. Nat. Acad. Sci, U.S.A., vol. 79 p. 2254-2258 (1982).

Zak, Michail, et al. "Non-Lipschitz Dynamics Approach to Discrete Event Systems," by Michail Zak and Ronald Meyers (Mathematical Modelling and Scientific Computing: An International Journal, Dec. 1995.

Zak, M "Physical models of cognition," Int. J. of Theoretical Physics, vol. 33, 5, pp. 1114-1161 (1994)).

Cauwenberghs, G. et al., "Fault-tolerant dynamic multi-level storage in analog VLSI," IEEE Trans. Circuits and Systems II: Analog and Digital Signal Processing 41(12), 827-829 (1994).

Cauwenberghs, G, "Analog VLSI stochastic perturbative learning architectures," Int. J. Analog Integrated Circuits and Signal Processing, 13(1/2), 195-209 (1997).

Bollt, Erik, "Attractor Modeling and Empiricalnonlinear Model Reduction of Issipative Dynamical Systems," International Journal of Bifurcation and Chaos, vol. 17, No. 4 (2007) 1199-1219.

Devoue, V., "Generalized Solutions to a Non Lipschitz-Cauchy Problem," Journal of Applied Analysis vol. 15, No. 1 (2009), pp. 1-32.

Fukuda, O. et al., "Pattern Classification of EEG Signals Using a Log-linearized Gaussian Mixture Neural Network," Neural Networks, 1995. Proceedings., IEEE International Conference on, vol. 5, pp. 2479-2484 (Nov./Dec. 1995).

* cited by examiner

TERMINAL REPELLER 12
$v' = -q(v) + \epsilon(t)$.

FIG. 4 Synaptic Connectivity

Top waveform: → Synaptic integration x(t)

Central waveform: quantization q(t).
Bottom waveform: neural state v(t).

Sample output waveforms of a single neuron configured alternatingly in terminal attraction and repulsion mode.

APPARATUS AND METHOD FOR USING ANALOG CIRCUITS TO EMBODY NON-LIPSCHITZ MATHEMATICS AND PROPERTIES USING ATTRACTOR AND REPULSION MODES

STATEMENT OF GOVERNMENT INTEREST

The embodiments herein may be manufactured, used, and/or licensed by or for the United States Government without the payment of royalties.

BACKGROUND OF THE INVENTION

Named after Rudolf Lipschitz, the Lipschitz continuity is a form of uniform continuity for functions which are limited to how fast the function can change, i.e., for every pair of points in a graph of a function, the secant of the line segment defined by the points has an absolute value no greater than a definite real number, which is referred to as the Lipschitz Constant.

According to Wikipedia, http://en.wikipedia.org/wiki/Lipschitz_continuity, mathematically, a function $$f:X \to Y$$

is called Lipschitz continuous if there exists a real constant $K \geq 0$ such that, for all $x_1$ and $x_2$ in X, $$d_Y(f(x_1), f(x_2)) \leq K d_X(x_1, x_2).$$

where K is referred to as a Lipschitz constant for the function $f$. The function is Lipschitz continuous if there exists a constant. $K \geq 0$ such that, for all $x_1 \neq x_2$, $$\frac{d_Y(f(x_1), f(x_2))}{d_X(x_1, x_2)} \leq K.$$

With regard to Non-Lipschitz mathematics, the publication by Michail Zak and Ronald Meyers entitled "Non-Lipschitz Dynamics Approach to Discrete Event Systems," Mathematical Modelling and Scientific Computing An International Journal (December 1995) (1995 Zak publication), presents and discusses a mathematical formalism for simulation of discrete event dynamics (DED); a special type of "man-made" systems developed for specific information processing purposes. The main objective of the 1995 Zak publication is to demonstrate that the mathematical formalism for DED can be based upon a terminal model of Newtonian dynamics, which allows one to relax Lipschitz conditions at some discrete points. A broad class of complex dynamical behaviors can be derived from a simple differential equation as described in the 1995 Zak publication and in Michail Zak "Introduction to terminal dynamics," *Complex Systems* 7, 59-87 (1993)1

$$x = x^{1/3} \sin \omega t, \omega = \cos t \quad \text{(Equation 1A)}$$

In the publication by Michail Zak entitled "Terminal Attractors for Addressable Memory in Neural Networks," Physics Letters A, Vol. 133, Issues 1-2, pages 18-22 (Oct. 31, 1988) (hereby incorporated by reference), terminal attractors are introduced for an addressable memory in neural networks operating in continuous time. These attractors represent singular solutions of the dynamical system. They intersect (or envelope) the families of regular solutions while each regular solution approaches the terminal attractor in a finite time period. According to the author (Zak), terminal attractors can be incorporated into neural networks such that any desired set of these attractors with prescribed basins is provided by an appropriate selection of the weight matrix.

U.S. Pat. No. 5,544,280 to Hua-Kuang Liu, et al. ('280 patent) (hereby incorporated by reference), discloses a unipolar terminal-attractor based neural associative memory (TABAM) system with adaptive threshold for alleged "perfect" convergence. It is noted that an associative memory or content-addressable memory (CAM) is a special type of computer memory in which the user inputs a data word and the memory is searched for storage of the data word. If the data word is located in the CAM, the CAM returns a list of one or more locations or addresses where the data word is located.

According to the '280 patent, one of the major applications of neural networks is in the area of associative memory. The avalanche of intensive research interests in neural networks was initiated by the work of J. J. Hopfield, "Neural Networks and Physical Systems with Emergent Collective Computational Abilities," Proc. Nat. Acad. Sci, U.S.A., Vol. 79 p. 2254-258 (1982) (hereby incorporated by reference). U.S. Pat. No. 4,660,106 (in which Hopfield is listed as the inventor) (hereby incorporated by reference) discloses an associative memory modeled with a neural synaptic interconnection matrix and encompasses an interesting computation scheme using recursive, nonlinear thresholding. Further investigation reported that the storage capacity of the Hopfield Model is quite limited due to the number of spurious states and oscillations. In order to alleviate the spurious states problems in the Hopfield model, the concept of terminal attractors was introduced by M. Zak, "Terminal Attractors for Addressable Memory in Neural Networks, Phys. Lett. Vol. A-133, pp. 18-22 (1988)(hereby incorporated by reference). However, the theory of the terminal-attractor based associative neural network model proposed by Zak determines that a new synapse matrix totally different from the Hopfield matrix is needed. This new matrix, which is very complex and time-consuming to compute, was proven to eliminate spurious states, increase the speed of convergence and control the basin of attraction. Zak's derivation shows that the Hopfield matrix only works if all the stored states in the network are orthogonal. However, since the synapses have changed from those determined by Hebb's law, Zak's model is different from the Hopfield model, except for the dynamical iteration of the recall process. According to the '280 patent, the improvement of the storage capacity of the Hopfield model by the terminal attractor cannot be determined based on Zak's model. The '280 patent discloses a TABAM system which, unlike the complex terminal attractor system of Zak, supra, is not defined by a continuous differential equation and therefore can be readily implemented optically.

U.S. Pat. No. 6,188,964 hereby incorporated by reference, purportedly discloses a method for generating residual statics corrections to compensate for surface-consistent static time shifts in stacked seismic traces. The method includes a step of framing the residual static corrections as a global optimization problem in a parameter space. A plurality of parameters are introduced in N-dimensional space, where N is the total number of the sources and receivers. The objective function has a plurality of minimum in the N-dimensional space and at least one of the plurality of minimum is a global minimum. An iteration is performed using a computer; a plurality of pseudo-Lipschitz constants are used to construct a plurality of Pijavski cones to exclude regions on the N-dimensional space where the global minimum is unlikely until a global minimum is substantially reached. See Col. 7, lines 1-10. Using described procedures, it is reported that a reasonably good estimate of the global maximum may be determined. See Col. 9, Lines 45-51.

SUMMARY OF THE INVENTION

A preferred embodiment of the present invention is directed to the use of analog VLSI technology to implement non-Lipschitz dynamics in networks of coupled neurons for information processing. A component in the analog circuit implementation is an attractor/repeller neuron which faithfully approximates the modulated terminal dynamics $\dot{v}=s(t)$ sgn$(v)+\epsilon(t)$. The attractor/repeller neuron may be programmable to become either a terminal attractor or terminal repeller. A preferred embodiment comprises a programmable interconnected network of eight non-Lipschitz neurons implemented in analog VLSI as illustrated in FIG. 6. Measurements on the fabricated chip have confirmed the generation of proper terminal dynamics. A circuit board has been developed to interface the chip with instrumentation and to configure the chip in different modes of operation.

The method and network use both terminal attractors and terminal repellers in the construction of an analog circuit to achieve a non-Lipschitz dynamics process which can solve important mathematical and physics, problems. The analog circuit uses "noise" in the circuit where the system is near the attractor/repeller points to introduce randomness into the branching of the dynamical paths. If the analog circuit were cooled to low temperature or otherwise implemented in a quantum system the noise there would come from quantum effects. Because of the non-Lipschitz properties, the method can be used to: a) make neural network analog circuits, b) improve the speed of circuits, and c) increase the speed of computer calculations.

A preferred embodiment comprises a network of coupled neurons for implementing Non-Lipschitz dynamics for modeling nonlinear processes or conditions comprising: a plurality of attractor/repeller neurons, each of the plurality of neurons being configurable in attractor and repulsion modes of operation, the plurality of attractor/repeller neurons being programmable by an external control signal; a plurality of synaptic connections; at least a portion of the plurality of neurons being interconnected by the synaptic connections for passage of data from one neuron to another; and feedback circuitry for incrementing and decrementing an analog voltage output depending upon the output of the synaptic connection; whereby by the circuit solves Non-Lipschitz problems by programably controlling the attractor and repulsion modes of operation.

The invention may be used to solve problems such as the Fokker-Plank equation, Schrödinger equation, and Neural computations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
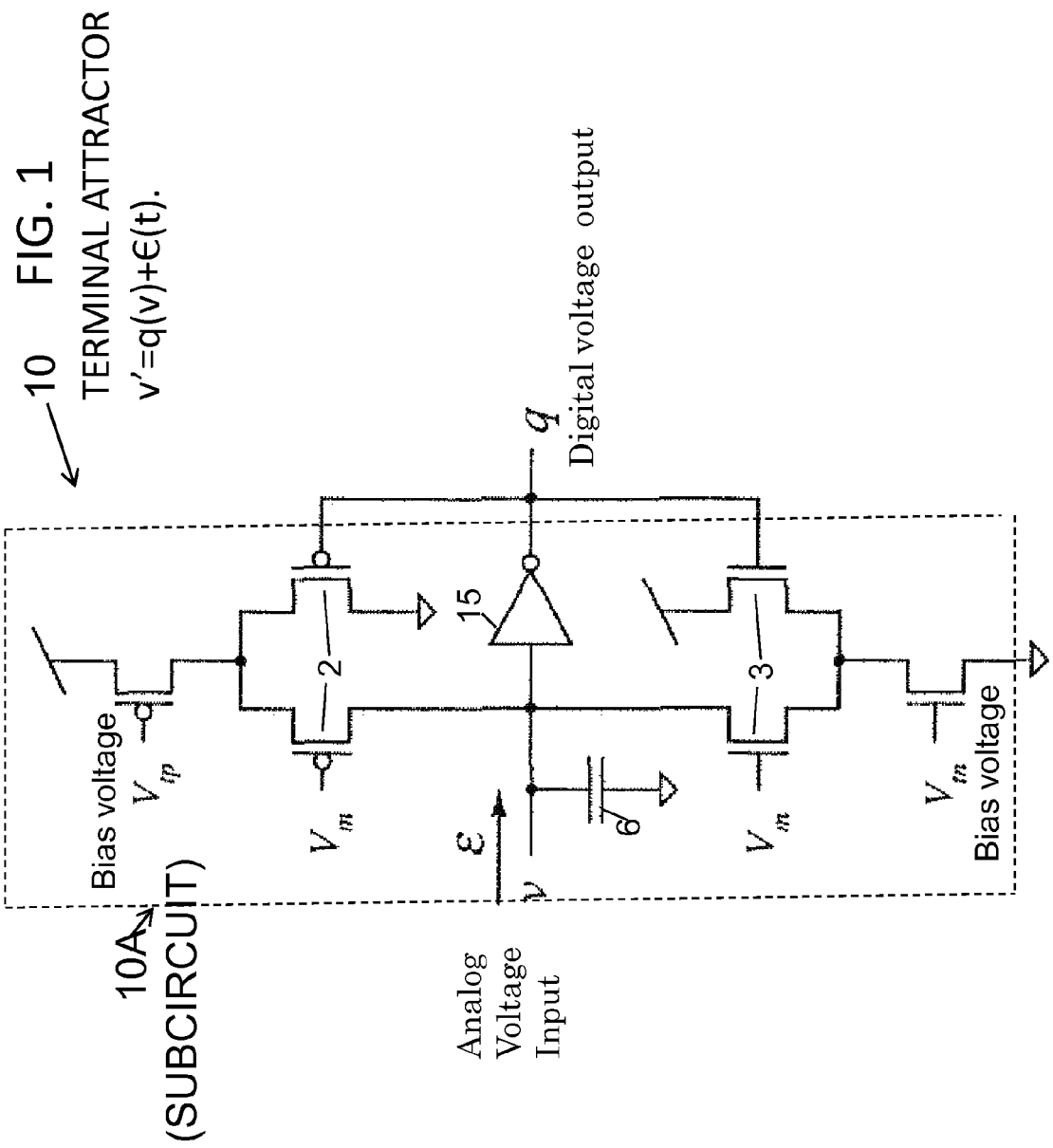
FIG. 1 illustrates a schematic-diagram of a Terminal Attractor 10, $\dot{v}=q(v)+\epsilon(t)$.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The paper entitled "Non-Lipschitz Dynamics Approach to Discrete Event Systems," by Michail Zak and Ronald Meyers (Mathematical Modelling and Scientific Computing An International Journal, December 1995) (hereby incorporated by reference) presents and discusses a mathematical formalism for simulation discrete event dynamics (DED)—a special type of "man-made" systems to serve specific purposes of information processing. The main objective of this work is to demonstrate that the mathematical formalism for DED can be based upon terminal model of Newtonian dynamics, which allows one to relax Lipschitz conditions at some discrete points. A broad class of complex dynamical behaviors can be derived from a simple differential equation, as referenced in Zak, M "Introduction to terminal dynamics," *Complex Systems* 7, 59-87 (1993)(hereby incorporated by reference):

$$\dot{x} = x^{1/3} \sin \omega t, \omega = \cos t \qquad \text{(Equation 1A)}$$

The solution to Eq. (1A) can be presented in a closed form. Indeed, assuming that $|x| \to 0$ at $t=0$, one obtains a regular solution:

$$x = \pm \left(\frac{4}{3\omega}\sin^2\frac{\omega}{2}t\right)^{\frac{3}{2}} \text{ if } x \neq 0 \qquad \text{(Equation 2A)}$$

and a singular solution (an equilibrium point):

$$x = 0. \qquad \text{(Equation 3A)}$$

The Lipschitz condition at the equilibrium point $x=0$ fails since $$\left|\frac{d\dot{x}}{dx}\right| = \frac{1}{3}x^{-\frac{2}{3}}\sin\omega t \to \infty \text{ at } x \to 0. \qquad \text{(Equation 4A)}$$

As follows from (Equation 2A), two different solutions are possible for "almost the same" initial conditions. The fundamental property of this result is that the divergence of these solutions from $x=0$ is characterized by an unbounded parameter, U:

$$\sigma = \lim_{t \to 0}\left[\frac{1}{t}\ln\frac{\left(\frac{4}{3\omega}\sin^2\frac{\omega}{2}t\right)^{\frac{3}{2}}}{2|x_0|}\right] = \infty, |x_0| \to 0 \qquad \text{(Equation 5A)}$$

where $t_0$ is an arbitrarily small (but finite) positive quantity. The rate of divergence (5A) can be defined in an arbitrarily small time interval, because the initial infinitesimal distance between the solutions (Equation 2A) becomes finite during the small interval $t_0$. Recalling that in the classical case when the Lipschitz condition is satisfied, the distance between two diverging solutions can become finite only at $t \to 0$ if initially this distance was infinitesimal.

The solution (Equation 2A) and (Equation 3A) co-exist at $t=0$, and that is possible because at this point the Lipschitz condition fails (see Eq. 4A). Since:

$$\frac{d\dot{x}}{dx} > 0 \text{ at } |x| \neq 0, t > 0, \qquad \text{(Equation 6A)}$$

the singular solution (Equation 3A) is unstable, and it departs from rest following Eq. (3A). This solution has two (positive and negative) branches, and each branch can be chosen with the same probability ½. It should be noticed that as a result of Equation (4A), the motion of the particle can be initiated by infinitesimal disturbances (that never can occur when the Lipschitz condition is in place since an infinitesimal initial disturbance cannot become finite in finite time).

Strictly speaking, the solution (Equation 2A) is valid only in the time interval $$0 \leq t \leq \frac{2\pi}{\omega}, \qquad \text{(Equation 7A)}$$

and at $$t = \frac{2\pi}{\omega}$$

coincides with the singular solution (Equation 3A). For $$t > \frac{2\pi}{\omega},$$

Eq. (2A) becomes unstable, and the motion repeats itself to the accuracy of the sign in Equation (2A).

Hence, the solution performs oscillations with respect to its zero value in such a way that the positive and negative branches of the solution (2A) alternate randomly after each period equal to $$\frac{2\pi}{\omega}.$$

Another variable is introduced in Equation (8A):

$$\dot{y} = x, (y=0 \text{ at } x=0). \qquad \text{(Equation 8A)}$$

After the first time interval $$t = \frac{2\pi}{\omega}$$

$$y = \pm \int_0^{\frac{2\pi}{\omega}} \left(\frac{4}{3\omega}\sin^2\frac{\omega}{2}t\right)dt = 64(3\omega)^{-\frac{5}{2}} = \pm h. \qquad \text{(Equation 9a)}$$

After the second time interval $$t = \frac{4\pi}{\omega}$$

$$y = \pm h \pm h. \qquad \text{(Equation 10A)}$$

Obviously, the variable y performs an unrestricted symmetric random walk: after each time period $$\tau = \frac{2\pi}{\omega}$$

it changes its value on ±h. The probability f (y, t) is governed by the following difference equation:

$$f\left(y, t + \frac{2\pi}{\omega}\right) = \frac{1}{2}f(y - h, t) + \frac{1}{2}f(y + h, t),$$ (Equation 11A)

$$\int_{-\infty}^{\infty} f(y, t) dy = 1$$

where h is expressed by Eq. (9A).

Equation (11A) defines f as a function of two discrete arguments:

$$y = \pm kh \text{ and } t = l\tau,$$ (Equation 12A)

where $\tau = \frac{2\pi}{\omega}$ and $k, l = 0, 1, 2, \ldots$ etc.

For convenience, for discrete variables y and t the same notations are kept as for their continuous versions.

By change of the variables:

$$z = \phi(y), y = (\phi^{-1}(z),$$ (Equation 13A)

one can obtain a stochastic process with a prescribed probability distribution:

$$\psi(z, t) = f[\varphi^{-1}(z), t]\left|\frac{d\varphi^{-1}}{dz}\right|.$$ (Equation 14A)

implemented by the dynamical system (Equation 1A), (Equation 8A), and (Equation 13A).

Actually this process represents a piecewise deterministic Markov process with the correlation time τ. However, by introducing a new variable:

$$\dot{u}(t) = \sum_{q=0}^{n} \alpha_q x(t - q - r), \text{ where } \alpha_q = const$$ (Equation 15A)

instead of (8A), one arrives at a non-Markov stochastic process with the correlation time (n+1)τ. The deterministic part of the process can be controlled if instead of (Equation 8A) one applies the following change of variables:

$$\dot{v}(t) = \sum_{q=0}^{n} b_q x^{2sq+1}, \text{ where } b_q = const.$$ (Equation 16A)

In particular, the deterministic part of the process can include a pause it for instance, Equation 14A is reduced to the following:

$$\dot{u}(t) = x(t) + X(t - \tau)$$ (Equation 17A)

Returning to Equation 1A and assuming that it is driven by a vanishingly small input ε:

$$\dot{x} = x^{1/3} \sin \omega t + \epsilon, \epsilon \to 0$$ (Equation 18A)

From the viewpoint of information processing, this input can be considered as a message or an event. This message can be ignored when x≠0, or when ẋ=0, but the system is stable, i.e., x=πω, 2πω, . . . etc. However, it becomes significant during the instants of instability when ẋ=0, at $$t = 0, \frac{\pi}{2\omega},$$

. . . etc. Indeed, at these instants, the solution to (18A) would have a choice to be positive or negative if ε=0, (see Equation (2A)).

However, with ε≠0

$$\text{sgn} x = \text{sgn}\epsilon \text{ at } t = 0, \frac{\pi}{2\omega}, \ldots \text{ etc.}$$ (Equation 19A)

i.e. the sign of ε at the critical instances to time (Equation 19A) uniquely defines the evolution of the dynamical system (Equation 18A).

Actually the event ε may represent an output of a microsystem which uniquely controls the behavior of the original dynamical system (Equation 19A).

The probability f(y, t), is governed by the following difference equation:

$$f\left(y, t + \frac{2\pi}{\omega}\right) = pf(y - h, t) + (1 - p)f(y + h, t)$$ (Equation 20A)

where $$p = \begin{cases} 1 & \text{if sgn}\epsilon = 1 \\ 0 & \text{if sgn}\epsilon = -1 \\ \frac{1}{2} & \text{if } \epsilon = 0 \end{cases}.$$ (Equation 21A)

Actually, the evolution of the probability distribution in Equation 20A is represented by rigid shifts of the initial probability distribution f(y, 0), unless sgn ε=0.

The applications of the non-Lipschitz dynamics include stochastic model fitting for identification of physical, biological and social systems, simulation of collective behavior, models of neural intelligence (as discussed in Zak; NI "Introduction to terminal dynamics," *Complex Systems* 7, 59-87 (1993)]; and Zak, M "Physical models of cognition," *Int. J. of Theoretical Physics* 5 (1994), both of which are hereby incorporated by reference).

Non-Lipschitz coupled dynamics in neural networks offer an attractive computational paradigm for combining neural information processing with chaos complexity and quantum computation, as discussed in M. Zak, J P Zbilut and R E Meyers, *From Instability to Intelligence*, Lecture Notes in Physics 49, Springer-Verlag (1997). A fundamental component in the non-Lipschitz models is the terminal attractor:

$$\dot{v} = q(v) + \epsilon(t)$$ (Equation 22A)

where the function q(v) is monotonically decreasing and zero at the origin, but with a singularity in the first-order derivative. The singularity at the origin allows the state variable v to reach the stable equilibrium point v=0 in finite time, and remain there indefinitely.

A terminal repeller is obtained by time-reversal of the attractor dynamics:

$$\dot{v} = -q(v) + \epsilon(t)$$ (Equation 23A)

with an unstable equilibrium point at the origin. The singularity in the first order derivative now allows the state variable v to escape the equilibrium in finite time, even in the absence of noise ϵ(t). Variable timing in the escape of terminal repellers contribute randomness to an otherwise deterministic system.

For information processing, it is desirable to modulate the terminal dynamics of v(t) with an external signal s(t), that can switch between terminal attraction and repulsion modes of operation:

$$\dot{v} = s(t)q(v) + \epsilon(t) \quad \text{(Equation 24A)}$$

where s(t)>0 for terminal attraction, s(t)<0 for terminal repulsion, and s(t)=0 for stationary dynamics. The timing of the signal s(t) allows to enforce zero initial conditions on the state variable v(t) in attractor mode, for subsequent repulsion as influenced by ϵ. The critical dependence of the trajectory v(t) on initial conditions in the noise (or signal) ϵ(t) can be exploited to generate coupled nonlinear chaotic dynamics in a network of neurons. The model of neural feedback can be generally written with activation function $$\epsilon_i = f(x_i) \quad \text{(Equation 25A)}$$

and with synaptic coupling dynamics $$x_i = \Sigma_j T_{ij} q_j \quad \text{(Equation 26A)}$$

Various instances of the model with different activation functions f(.), synaptic coupling strengths $T_{ij}$, and modulation sequence s(t), give rise to a vast array of entirely different dynamics that model a variety of physical phenomena from turbulence in fluid mechanics to information processing in biological systems. See, for example, M. Zak, JP Zbilut and R E Meyers, *From Instability to Intelligence*, Lecture Notes in Physics 49, Springer-Verlag (1997) (hereby incorporated by reference)

Circuit Model

The main difficulty in the circuit implementation of non-Lipschitz terminal attraction and repulsion lies in precise realization of the singularity of the first order derivative in the state variable. Strictly speaking, it is impossible to implement the desired singularity as it would require an amplifier with both infinite gain and infinite bandwidth. A suitable approximation that generates terminal dynamics within the limits of noise in the circuits is desired.

Terminal Attractor 10

Without loss of generality a binary quantizer element for q(v) is considered:

$$q(v) = \cdot sgn(v) \quad \text{(Equation 27A)}$$

conveniently implemented using a high-gain inverting amplifier 15, quantizing the analog voltage v to a digital voltage q. FIG. 1 shows the implementation of the terminal attractor 10 using the quantization model (Equation 27A). Two complementary MOS differential pairs (2, 3) steer a current of polarity controlled by q into a capacitor (6) on the node v, generating the dynamics (Equation 22A). The temporal scale of the terminal dynamics is given by the capacitance and the tail currents of the differential pairs, set by nMOS and pMOS bias voltages $V_{tn}$ and $V_{tp}$, respectively.

Parasitics on the q node effect a delay in the quantization which could potentially give rise to limit cycle oscillations in v(t) around the terminal attractor state. The amplitude of these oscillations can be made arbitrarily small by increasing the dominance of the pole corresponding to the v node. This is accomplished by increasing the capacitance on v, and decreasing the amplitude of the tail currents. It is also possible to internally compensating the amplifier, at the expense of the sharpness of the singularity in the characteristic q(v).

Terminal Repeller 12

Figure 2:
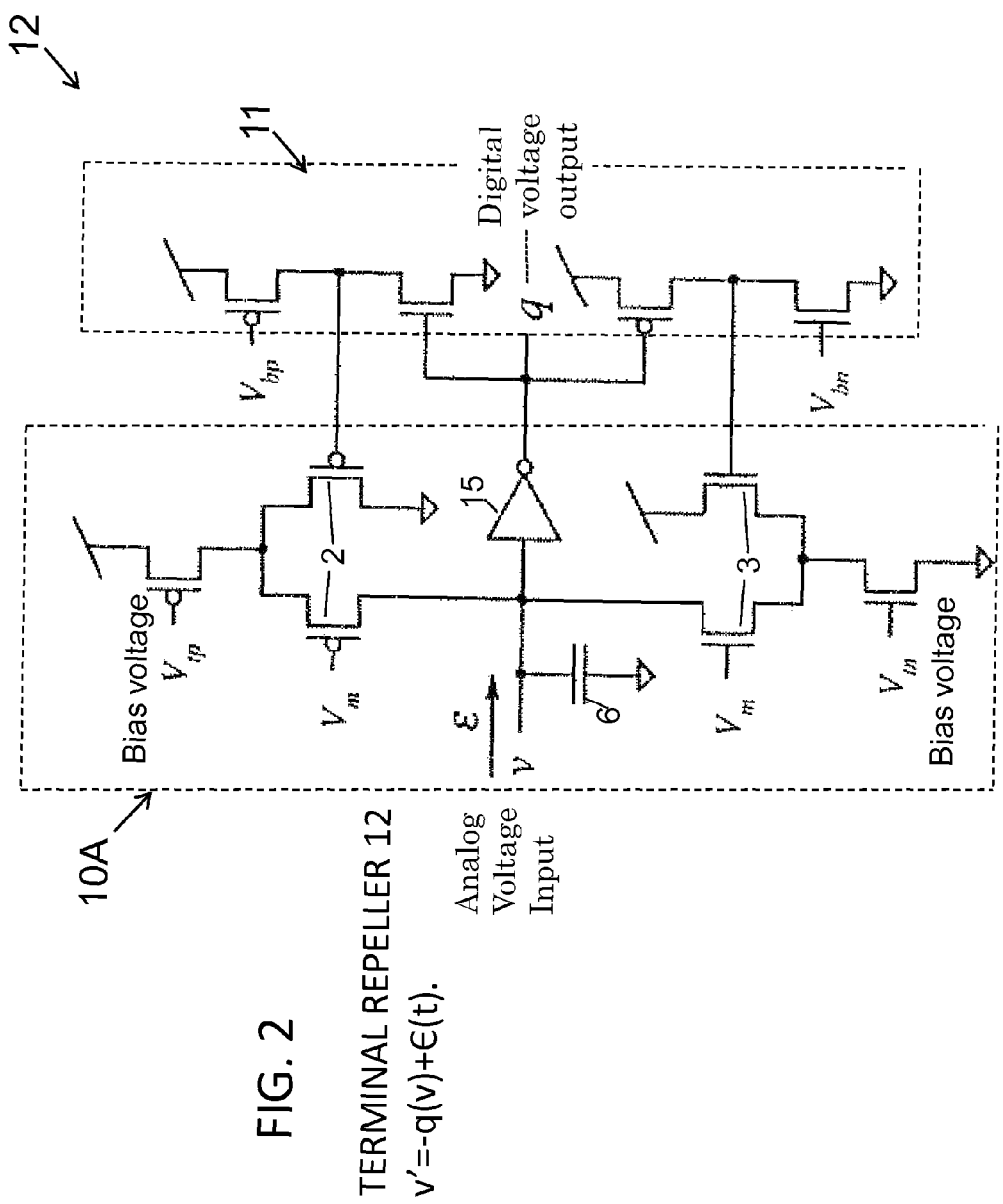
FIG. 2 illustrates a schematic diagram of a Terminal Repeller 11, $\dot{v}=-q(v)+\epsilon(t)$.

The terminal attractor circuit 10 can be modified to implement terminal repulsion by inclusion of an additional inversion stage between the inverting amplifier output and the current-steering differential pairs. Terminal repeller 12 comprises subcircuits 10A (also appearing in FIG. 1) and 11 as shown in FIG. 2. The inversion stages are shown in the terminal repeller 12 of FIG. 2 as two additional inverting amplifiers. The reason for using complementary (pseudo-nMOS and pseudo-pMOS) structures for inverting amplifiers is to provide hysteresis in the positive feedback dynamical response of q(v). The pseudo-nMOS amplifier (top) provides a threshold near the lower supply range, and the threshold of the pseudo-pMOS amplifier (bottom) approaches the higher supply.

The delay introduced by the extra stage is not a source of concern as positive feedback excludes the possibility of limit oscillations. More immediately of concern are effects of transistor offset and mismatch in the circuit implementation. These effects can be minimized by reusing the same circuit components for implementing both terminal attraction and repulsion in alternating modes of operation.

Non-Lipschitz Neuron 13

Figure 3:
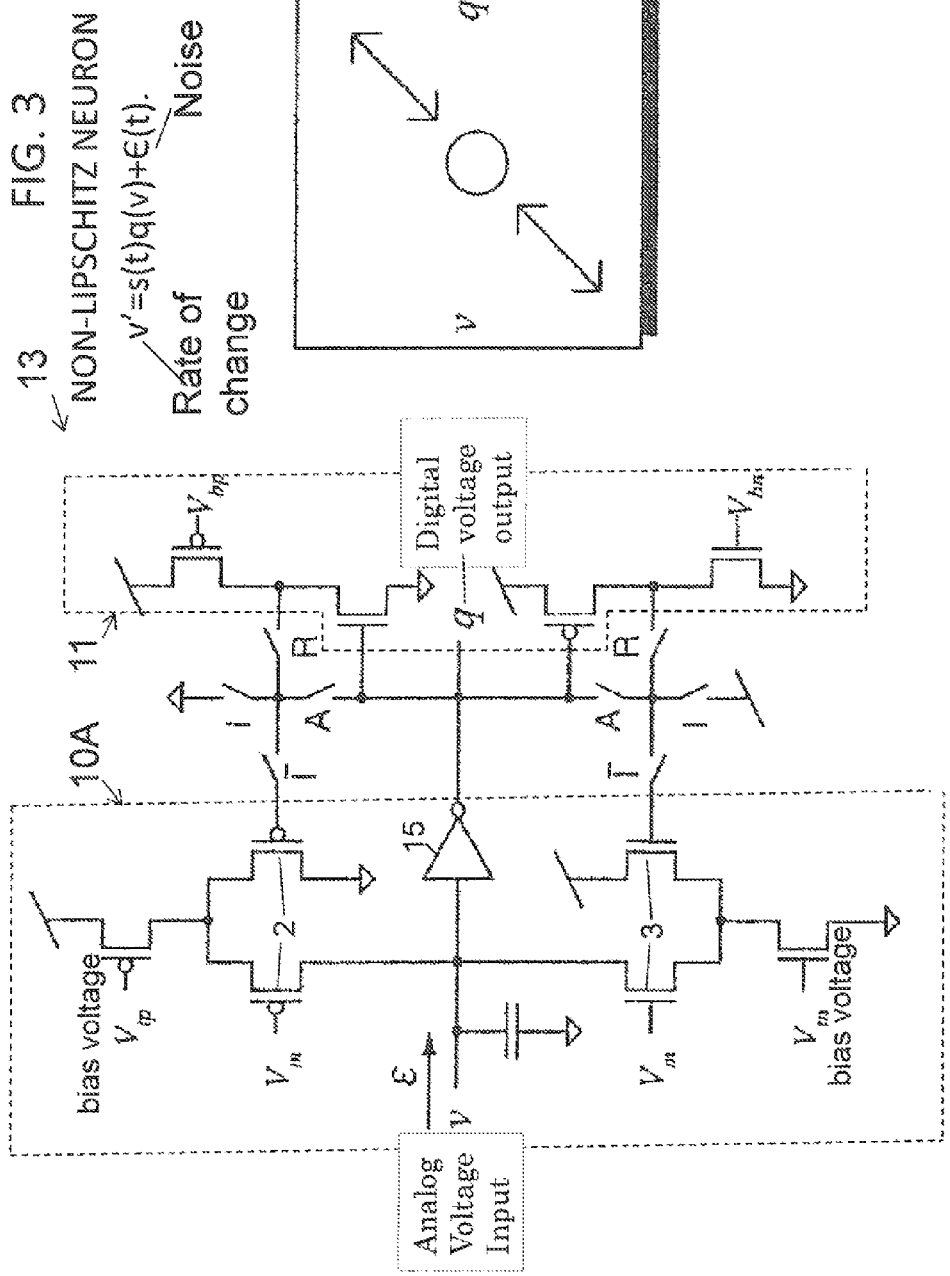
FIG. 3 illustrates a schematic diagram of a Non-Lipschitz Neuron 12, $\dot{v}=s(t)q(v)+\epsilon(t)$. The signal s(t) controls the dynamics through the switches A, R and I: terminal attraction (s=1) when A is selected; terminal repulsion (s=−1) when R is selected; and neither (s=0) when I is selected.

The non-Lipschitz neuron implements the modulated form (Equation 24A) and in effect combines both terminal attraction and repulsion circuits of FIGS. 1 and 2 in a single circuit, shown in FIG. 3. The modulation signal s(t) takes one of three levels {−1, 0, +1}, supplied in the form of switch control signals R (Repel), I (Inert) and A (Attract), respectively. The signals A and R are complementary (set globally by a single R/overline A control line), and configure the circuit either as the attractor of FIG. 1, or the repellor of FIG. 2. Signal I breaks either of the two feedback loops and leaves v in a high-impedance (inert) state.

By using the same quantizer element in all three operation modes, it is possible to initialize the node voltage v in attraction mode to the same equilibrium value as in repulsion mode. Switching s(t) (R/overline A) then turns the equilibrium point from terminally stable to terminally unstable. The hysteresis [dead zone of feedback from the output q(v)] in repulsion mode allows to integrate the external neural signal ϵ(t) over time before positive feedback selects a definite direction in the output. For a zero signal component of ϵ, noise present internally in the circuit will cause the output to randomly decide polarity.

Synaptic and Neural Network Dynamics

Figure 4:
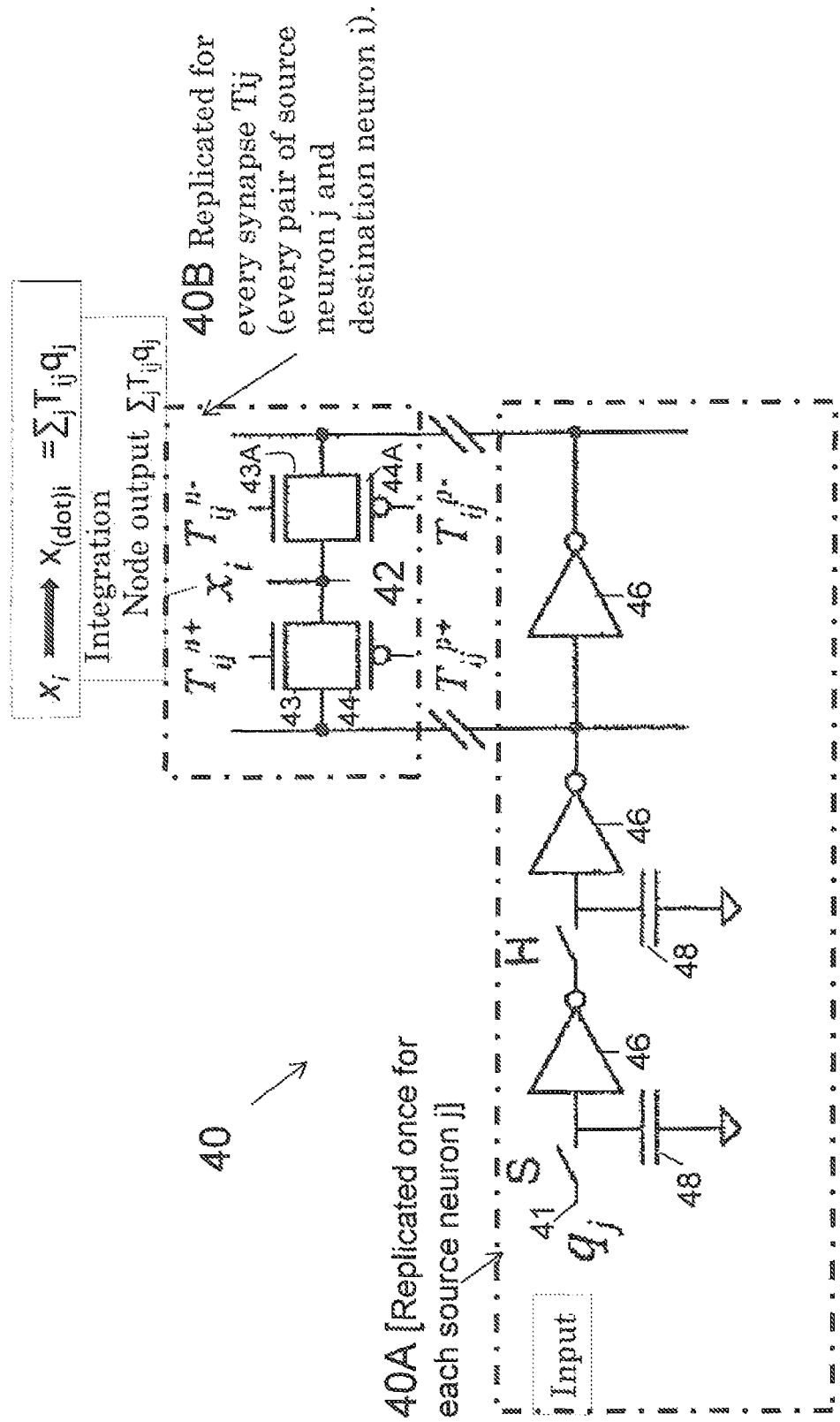
FIG. 4 illustrates a schematic diagram of a Synaptic Connectivity, $\dot{x}_i=\Sigma_j T_{ij} q_j$.

Synaptic connectivity according to Equation (26A) is implemented using the current-inode circuit cell shown in FIG. 4. The circuit takes a digital input $q_j$ that selects between one of two current sources $T_{ij}^+$ ($q_j$=1) and $T_{ij}^-$ ($q_j$=−1), to contribute a current $T_{ij}q_j$ onto an integration node $x_i$ (42) Both current sources are bipolar, and are implemented as the difference between positive currents collected on the drain terminals of nMOS 43, 43A and pMOS transistors 44, 44A. The nMOS current sinking transistors 43, 43A are supplied with bias voltages $T_{ij}^{n+}$ and $T_{ij}^{n-}$ (near GND) on the gate terminals, and similarly the pMOS current sourcing transistors 44, 44A are supplied with bias voltages $T_{ij}^{p+}$ and $T_{ij}^{p-}$ (near Vdd). The hashmarks shown in FIG. 4 indicate that the states $q_j$ couple to several $x_i$ (integration nodes 42) in the form of several synapses $T_{\{ij\}}$. The source terminals are switched by $q_j$ (and $\overline{q}_j$) rather than gate terminals, to avoid switch injection noise during transients and to allow precise control of very small currents, as needed to attain large dynamic range in neural integration times.

Referring now to FIG. 4, the values for the currents $T_{ij}$ may be determined as follows. $T_{ij}^{n+}$ onto nMOS 43 generates a current out of $x_i$ (negative into $x_i$) when $q_j$ is logic high. Conversely, $T_{ij}^{n-}$ onto nMOS 43A generates a current out of $x_i$ (negative into $x_i$) when $q_j$ is logic low; $T_{ij}^{p+}$ onto pMOS 44 generates a current into $x_i$ (positive into $x_i$) when $q_j$ is logic high; and $T_{ij}^{p-}$ onto pMOS 44A generates a current into $x_i$ (positive into $x_i$) when $q_j$ is logic low. Therefore, the network implements the following net current into $x_i$, integrated onto node 42 in FIG. 5:

$$Cdx_i/dt = sum_j((T_{ij}^{p+} \cdot T_{ij}^{n+})q_j + (T_{ij}^{p-} - T_{ij}^{n-})\bar{q}_j)$$

where $q_j$ takes-values 0 (logic low) and 1 (logic high), and $\bar{q}_j$ is its complement. The constant values for the generated currents $T_{ij}^{n+}, T_{ij}^{n-}, T_{ij}^{p+}, T_{ij}^{p-}$ in this model are controlled by the voltages (and are exponential in the voltages) on these $T_{ij}^{n+}, T_{ij}^{n-}, T_{ij}^{p+}, T_{ij}^{p-}$ nodes.

In this regard, see G. Cauwenberghs and A. Yariv; "Fault tolerant dynamic multi-level storage in analog VLSI," *IEEE Trans: Circuits and Systems II: Analog and Digital Signal Processing* 41(12), 827-829 (1994) (hereinafter Cauwenberghs '94); and G. Cauwenberghs, "Analog VLSI stochastic perturbative learning architectures," *Int. J. Analog Integrated Circuits and Signal Processing*, 13(1/2), 195-209 (1997), both of which are hereby incorporated by reference. The drain terminals of nMOS 43, 43A, and pMOS 44, 44A transistors connect at an integration node 42.

Figure 5:
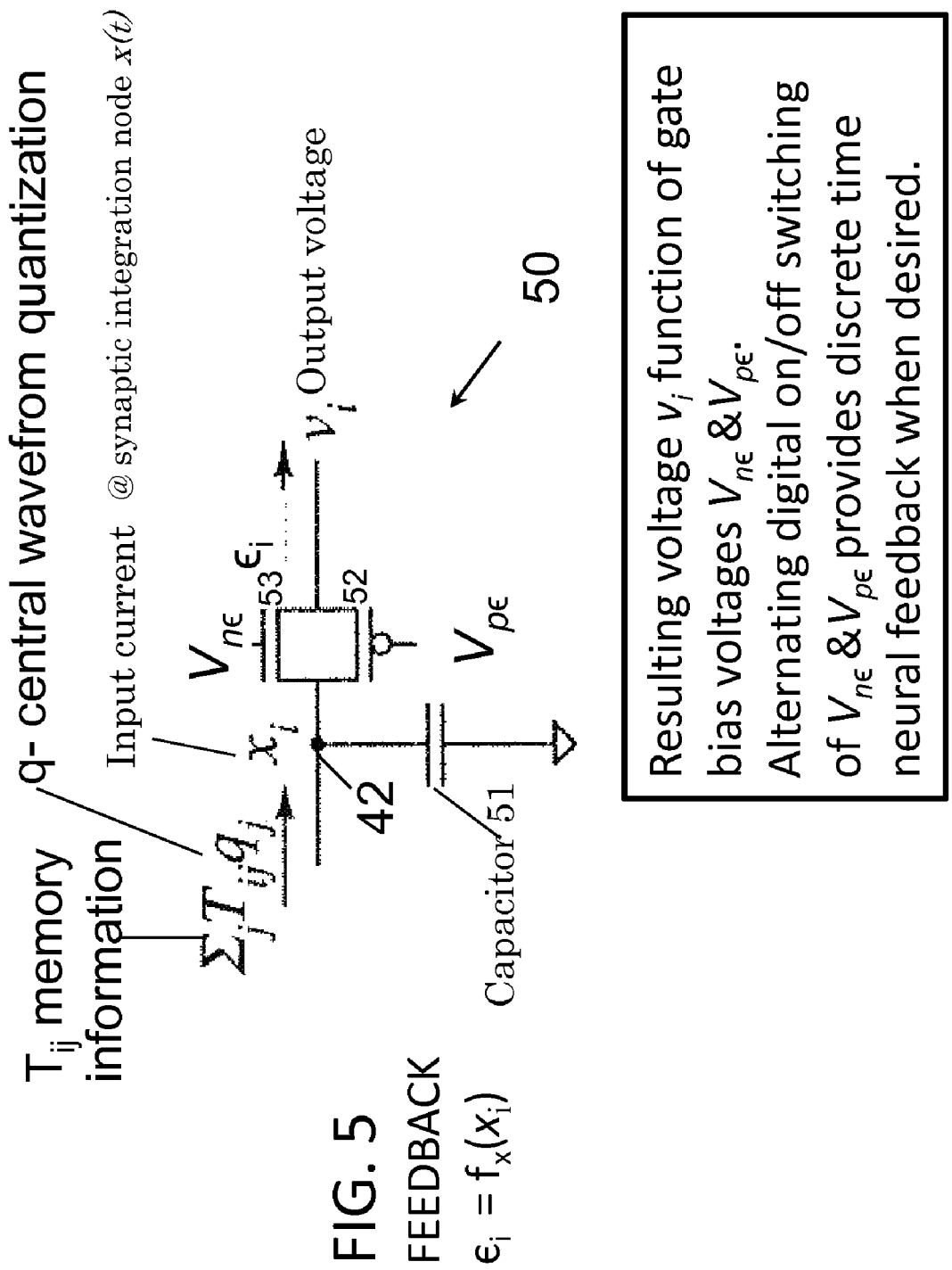
FIG. 5 illustrates a schematic diagram of a neural feedback element; i.e., FEEDBACK, $\epsilon_i=f(x_i)$.

The purpose of the generation of currents by 43, 43A, 44, and 44A is described in Cauwenberghs '94, which describes the implementation of an increment/decrement device in contact with a capacitive storage device similar to capacitor 51 in FIG. 5. In this instance, $q_j$ correlates to the binary quantization function described in Cauwenberghs '94. The resulting analog voltage function $V_i$ is the analog level defining the state of the memory, and $\delta$ the size of the partial increments, the procedure combines the consecutive steps of binary quantization $q_j(\ ): R \rightarrow +\{-1, +1\}$; and Incremental Refresh:

$$V_i \approx V_i + \Sigma T_{ij}$$

Iteration of this procedure yields a stored memory value $V_i$ as described further Cauwenberghs '94. This charge-pump type of implementation of the increment/decrement device in CMOS technology, in contact with a capacitive storage device 51 results in fixed charge increments or decrements on. Capacitive storage device 51 by selectively activating one of four supplied constant currents $T_{ij}^{n+}, T_{ij}^{n-}, T_{ij}^{p+}, T_{ij}^{p-}$ of sometimes opposite polarity, over a fixed time interval.

Further as to FIG. 4, the circuit 40A is replicated once for each source neuron j. The circuit 40B is replicated for every synapse Tij (every pair of source neuron j and destination neuron i). Also appearing in FIG. 4 are high gain inverting amplifiers 46 and capacitors 48.

The neural feedback element is shown in FIG. 5. The current $\Sigma_j T_{ij} q_j$ is integrated onto one of the capacitive nodes $x_i$ (42), and nonlinearly transformed into the output $\epsilon_i = f(xi)$. Control of bias voltages $V_{nc}, V_{pc}$, and determines the shape of the saturating function $f(x)$. Alternatively, digital on/off switching of $V_{nc}$ and $V_{pc}$ allows one to implement discrete-time neural feedback when desired.

VLSI Implementation and Experimental Results

Figure 6:
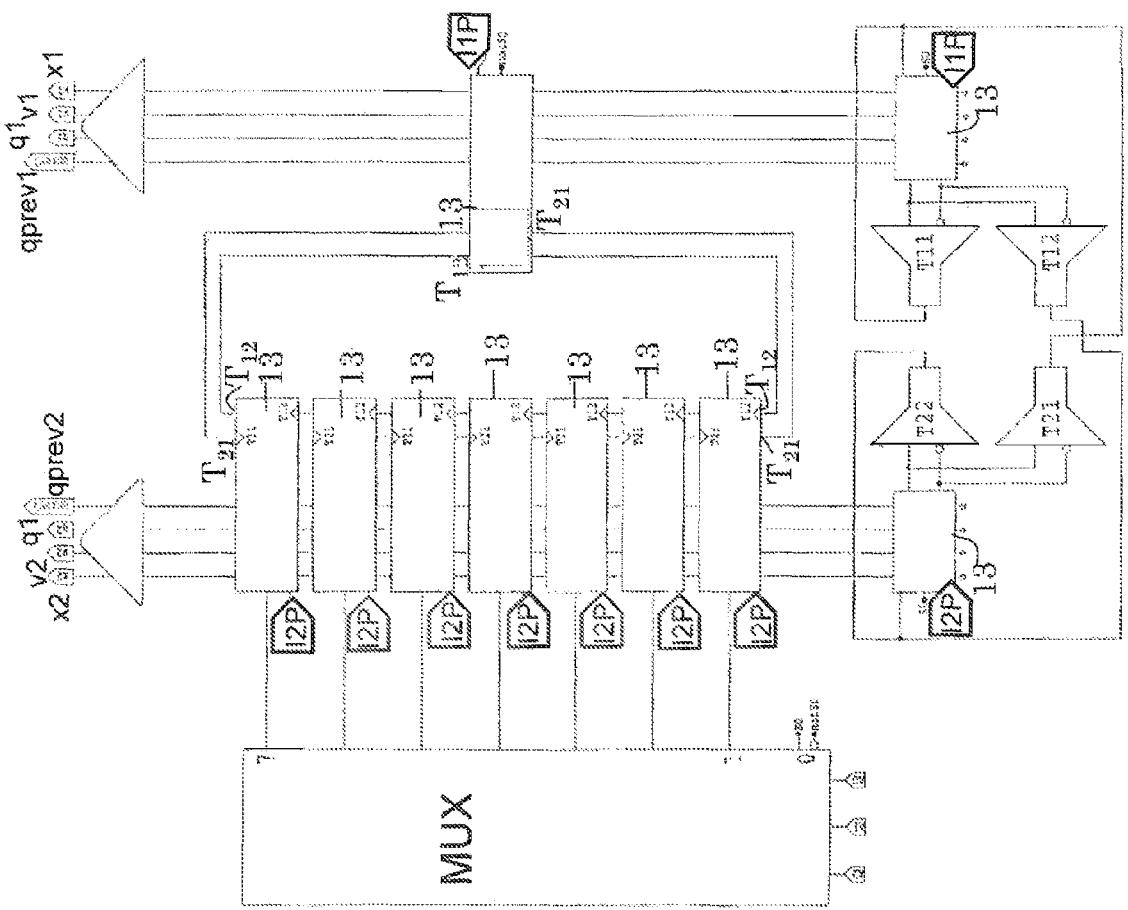
FIG. 6 is a schematic illustration of a preferred embodiment implemented architecture, i.e., the architecture and layout of an NLN (non-Lipschitz neuron) chip containing a coupled array of 8 neurons (center) and 2 individually coupled neurons (bottom).

FIGS. 3, 4, and 5 are connected together through the nodes v, q, and x, as labeled in the figures. FIG. 6 shows how the elements are connected together on the chip in two structures (8 chain-coupled neurons, and 2 cross-coupled neurons, respectively). More specifically, FIG. 3 shows the circuit diagram of a two-port element with analog input v and digital output q, and control variable s with three programmable states I (s=0), A (s=1) and R (s=−1). FIG. 1 and FIG. 2 are for illustration purposes and show the operation of FIG. 3 when s=1 (terminal attractor mode) and s=−1 (terminal repeller mode), respectively. FIG. 4 shows the circuit diagram of a synapse, with input $q_j$, and output current $x_i$ at an integration node 42. The bottom half of FIG. 4 is replicated once for every source neuron j; the top half is replicated for every synapse $T_{ij}$ (every pair of source neuron j and destination neuron i). FIG. 5 shows the circuit diagram of the feedback element, with input current $x_i$, and output voltage $v_i$. The neuron outputs $q_j$ connect through synapses $T_{ij}$ to other neurons $x_i$ (FIG. 4), through feedback to $v_i$ (FIG. 5), and through the non-Lipschitz neural elements (FIG. 3) back to neural outputs $q_i$ closing the loop.

FIG. 6 is a schematic illustration of a preferred embodiment implemented architecture, i.e., the architecture and layout of an NLN (non-Lipschitz neuron) chip. The top of FIG. 6 shows a network of eight "nearest-neighbor coupled" non-Lipschitz neurons 13, with identical nearest-neighbor synaptic connections ($T_{12}$ and $T_{21}$ (double line)), included along with the neuron circuits in each rectangular box 13). The synaptic connections $T_{12}$ and $T_{21}$ are between neighbors in the ring of 8 neurons. Each neuron 13 connects to its upper neighbor neuron 13 with synaptic strength $T_{12}$ and to its lower neighbor neuron 13 with synaptic strength $T_{21}$. The multiplexer (MUX) on the left allows one to look at the signal variables of any of the seven left neurons 13, together with those for the eighth neuron 13 on the right.

The lower part of FIG. 6 illustrates an additional two individual coupled neurons 13' that have been implemented on a 2 mm×2 mm chip in 1.2 μm CMOS technology. $T'_{22}, T'_{11}, T'_{12}, T'_{21}$ in the lower block represent synaptic connections $T'_{ij}$ between presynaptic neuron terminals qj and postsynaptic neuron terminals $x_i$, as defined in FIGS. 4 and 5, where both indices i and j take values 1 and 2 (there are two neurons). Each of the two neurons 13' has the feedback element of FIG. 5 (with input current $x_i$), connecting to the non-Lipschitz element of FIG. 3, and the sampler in the bottom of FIG. 4 (with sampled binary output $q_i$ and its complement $\bar{qi}$). There are two of these for the two neurons 13'. The $T_{ij}$ elements are positioned in the top part (40B) of FIG. 4 (with sampled neural states $q_j$ and $\bar{qj}$ as input, and current $x_i$ as output). There are four of these, connecting each neuron to itself and the other neuron.

Figure 7:
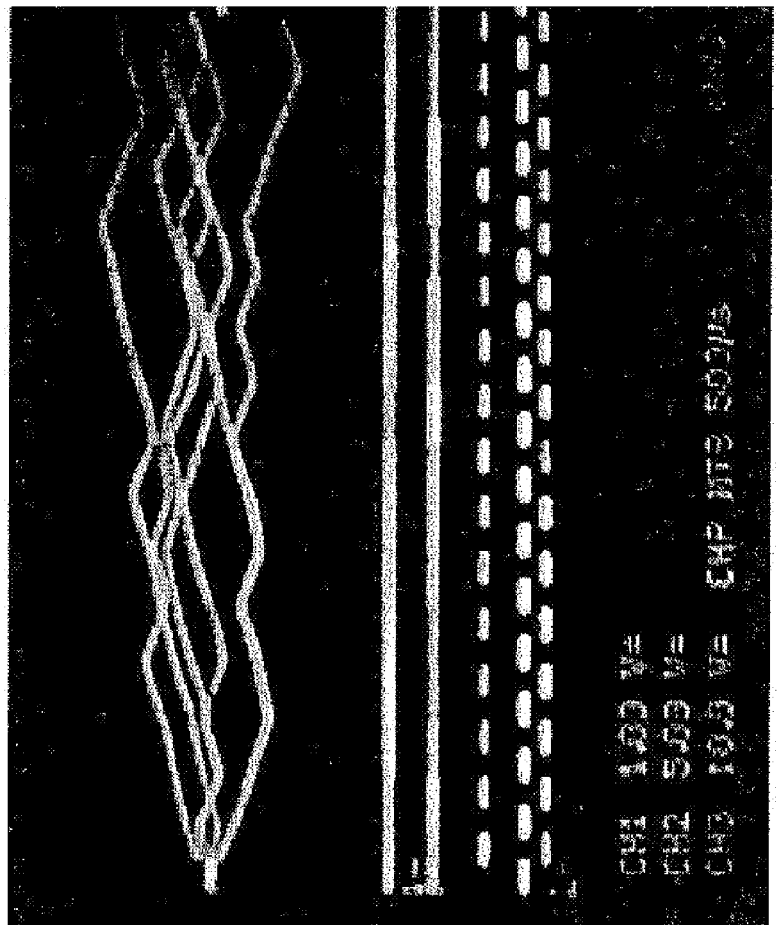
FIG. 7 illustrates sample output waveforms of a single neuron configured alternatingly in terminal attraction and repulsion modes. Top waveform: Synaptic integration x(t); Central waveform: quantization q(t); Bottom waveform: neural state v(t).

All cells are fully accessible through external inputs and multiplexed outputs. Timing of terminal dynamics is digitally controlled and synaptic connectivity and neural transfer characteristics are programmable through analog bias voltages. The chip tested fully functional, and has been integrated on a PCB board for characterization and experimentation. Example waveforms from one neuron in the chip, configured alternatingly in attractor and repulsion modes of operation, are shown in FIG. 7. FIG. 7 illustrates sample output waveforms of a single neuron configured alternatingly in terminal attraction and repulsion mode. Top waveform of FIG. 7 illustrates synaptic integration x(t). The central waveform illustrates quantization q(t). The bottom waveform of FIG. 7 illustrates neural state v(t).

As used herein, the terminology "neuron" means an electrically excitable cell or element that processes and transmits information by electrical signals. Each neuron has at least one input and at least one output.

As used herein, the terminology "attractor" relates to elements that provide, singular solutions of the dynamical system. They intersect (or envelope) the families of regular solutions while each regular solution approaches the terminal attractor in a finite time period. The methodology may utilize a closed form of the model to analytically reduce the system dynamics onto a stable invariant manifold, onto which empirical data is "attracted." According to Wikipedia, a trajectory of the dynamical system in the attractor does not have to satisfy any special constraints except for remaining on the attractor. The trajectory may be periodic or chaotic. If a set of points is periodic or chaotic, but the flow in the neighborhood is away from the set, the set is not an attractor, but instead is called a repeller (or repellor).

As used herein Tij represents interconnections between the neurons. Iterative adjustments of Tij may be a result of comparison of the net output with known correct answers (supervised learning) or as a result of creating new categories from the correlations of input data when the correct answers are not known (unsupervised learning).

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments; those skilled in the art will recognize that the embodiments herein can be practiced with modification within the spirit and scope of the appended claims.

What is claimed is:

1. A network of coupled neurons for implementing Non-Lipschitz dynamics for modeling nonlinear processes or conditions comprising:

a plurality of neurons, each of the plurality of neurons being configurable in attractor and repulsion modes of operation, the plurality of neurons being programmable by an external control signal;

a plurality of synaptic connections; at least a portion of the plurality of neurons being interconnected by the synaptic connections for passage of data from one neuron to another;

feedback circuitry for incrementing and decrementing an analog voltage output depending upon the output of the synaptic connection;

whereby by the circuit solves Non-Lipschitz problems by programably controlling the attractor and repulsion modes of operation in order to approximate a dynamical system or process.

2. The network of claim 1 wherein the plurality of neurons has a analog voltage input and a digital voltage output, and wherein the digital voltage output is inputted into one of the plurality of synaptic connections and integrated with synaptic currents to form an integrated output, and wherein the network further comprises a plurality of neural feedback connections, each neural feedback connection operating to input current from an interconnection node and output a voltage which is incremented or decremented based upon the synaptic currents.

3. The network of claim 2 wherein the neural feedback connection can be generally written in accordance with the activation function $$\epsilon_i = f(x_i).$$

4. The system of claim 2 wherein when the feedback from the output of one of the plurality of neurons in the repulsion mode causes a dead zone of feedback or hysteresis, the external neural signal $\epsilon_i$ is integrated aver time before positive feedback selects a definite direction in the output.

5. The network of claim 1 wherein the terminal attractor mode may be represented as $\dot{v}=q(v)+\epsilon(t)$ where $\epsilon(t)$ is the error or noise function to be minimized, $q(v)$ is the digital voltage output, and $\dot{v}$ is the analog voltage input; and the terminal repeller may be represented by $\dot{v}=-q(v)+\epsilon(t)$.

6. The network of claim 1 wherein each of the plurality of neurons approximate the modulated terminal dynamics of $v(t)=s(t)sgn(v)+\epsilon(t)$, where $v(t)$ is the analog voltage input; $q(v)$ is the digital voltage output, $sgn(v)$ is the binary quantizer element for $q(v)$, $\epsilon(t)$ is the error or noise function, and $s(t)$ is the external control signal that can switch between terminal attraction and repulsion modes of operation where $s(t)>0$ for terminal attraction, $s(t)<0$ for terminal repulsion, and $s(t)=0$ for stationary dynamics, and wherein the timing of the signal $s(t)$ allows enforcement of zero initial conditions on the state variable $v(t)$ in attractor mode, for subsequent repulsion as influenced by $\epsilon(t)$, and wherein the critical dependence of the trajectory $v(t)$ on initial conditions in the noise or error function $\epsilon(t)$ can be exploited to generate coupled nonlinear chaotic dynamics in the plurality of neurons.

7. The network of claim 2 wherein the network of neurons can be configured to generate nonlinear probabilistic dynamics that model physical phenomena from one of turbulence in fluid mechanics and information processing in biological systems.

8. The network of claim 1 further comprising a multiplexor and wherein the plurality of neurons are digitally controlled through external signals and multiplexed outputs.

9. The network of claim 2 wherein the external signal comprises one of three signals, a first signal for causing the neuron to enter the repulsion mode, a second signal for causing the neuron to enter an inert mode and a third signal for causing the neuron to enter an attraction mode.

10. The network of claim 2 wherein the synaptic connection comprises:

a digital voltage input for inputting the digital voltage output of the associated neuron;
    an external signal input for inputting the external signal;
    at least one capacitor for storage of a first voltage;
    at least one amplifier for amplifying the first voltage;
    an output node; and
    at least one selector for selecting a positive or negative output, the selector having a plurality of synapse lines for inputting memory information.

11. The network of claim 10 further comprising a feedback connection between an associated synaptic connection and an associated neuron; the feedback connection comprising an input, an output, at least one capacitive storage element and a selector, the input of the synaptic connection being connected to the output node of the associated synaptic connection; the capacitive storage element operating to store a voltage, and the selector operating to selectively output the stored voltage through the output to the analog voltage input of the associated neuron.

12. The network of claim 11 wherein the stored voltage is incrementally increased or decreased based upon the memory information inputted to the synapse lines.

13. The network of claim 7 wherein the analog circuit uses noise in the circuitry where the system is near the attractor/repeller points to introduce randomness into the branching of the dynamical paths.

14. The network of claim 1 wherein the network operates to solve problems such as the Fokker-Plank equation, Schrödinger equation, and Neural computations.

15. A method of programming a network for solving Non-Lipschitz problems comprising:
   providing a plurality of neurons, each neuron being programmable into a plurality of modes including repulsion and attraction modes;
   interconnecting the plurality of neurons using synaptic connections;
   providing feedback to at least one of the plurality of neurons;
   whereby by programming the neurons into repulsion and attraction modes, Non-Lipschitz terminal dynamics can be achieved.

16. The method of claim 15 wherein noise is used when the network is near the attractor/repeller points to introduce randomness into the branching of the dynamic paths.

17. The method of claim 15 wherein the step of providing a plurality of neurons comprises providing a plurality of attractor/repeller neurons, each of the plurality of attractor/repeller neurons being configurable in attractor and repulsion modes of operation, the plurality of attractor/repeller neurons being programmable by an external control signal; wherein the step of interconnecting the plurality of attractor/repeller neurons comprises using a plurality of synaptic, connections having memory inputs; at least a portion of the plurality of attractor/repeller neurons being interconnected by the synaptic connections for passage of data from one neuron to another; and wherein the step of providing feedback comprises utilizing at least one feedback connection for incrementing and decrementing an analog voltage output depending upon the output of the synaptic connection.

18. The method of claim 17 wherein the plurality of attractor/repeller neurons have an analog voltage input and a digital voltage output, and wherein the digital voltage output is inputted into one of the plurality of synaptic connections and integrated with memory inputs to form an integrated output which is inputted into an associated feedback connection, the associated neural feedback connection operating to input current from the associated synaptic connection and output a voltage which is incremented or decremented based upon the memory inputs.

19. The method of claim 17 wherein each of the plurality of attractor/repeller neurons approximate the modulated terminal dynamics of $v(t)=s(t)sgn(v)+\epsilon(t)$, where $v(t)$ is the analog voltage input; $q(v)$ is the digital voltage output, $sgn(v)$ is the binary quantizer element for $q(v)$, $\epsilon(t)$ is the error or noise function, and $s(t)$ is the external control signal that can switch between terminal attraction and repulsion modes of operation where $s(t)>0$ for terminal attraction, $s(t)<0$ for terminal repulsion, and $s(t)=0$ for stationary dynamics, and wherein the timing of the signal $s(t)$ allows enforcement of zero initial conditions on the state variable $v(t)$ in attractor mode, for subsequent repulsion as influenced by $\epsilon(t)$, and wherein the critical dependence of the trajectory $v(t)$ on initial conditions in the noise or error function $\epsilon(t)$ can be exploited to generate coupled nonlinear chaotic dynamics in the plurality of attractor/repeller neurons.

* * * * *